United States Patent

Fleckenstein et al.

[11] Patent Number: 5,997,050
[45] Date of Patent: Dec. 7, 1999

[54] DOUBLE CONE COUPLING NIPPLE OF A STEEL TUBING AND METHOD OF MAKING SAME

[75] Inventors: Günter Fleckenstein, Esslingen; Thomas Schmitz, Schwaikheim; Manfred Meyer, Esslingen; Siegbert Moosbrugger, Münsingen, all of Germany

[73] Assignees: DaimlerChrysler AG, Stuttgart; SIEBE Fluid Systems GmbH, Schelklingen, both of Germany

[21] Appl. No.: 09/009,363

[22] Filed: Jan. 20, 1998

[30] Foreign Application Priority Data

Jan. 17, 1997 [DE] Germany .......................... 197 01 561

[51] Int. Cl.⁶ .................................................. F16L 19/028
[52] U.S. Cl. .......................... 285/332; 285/356; 285/916; 285/917; 285/334.5; 285/148.19; 29/890.053; 72/370.14
[58] Field of Search ..................... 285/332, 917, 285/334.5, 356, 916, 148.19; 29/890.053; 72/370.13, 370.15, 370.24

[56] References Cited

U.S. PATENT DOCUMENTS

| 1,354,419 | 9/1920 | Reppetto ........................ 285/139.1 X |
| 2,150,524 | 3/1939 | Starr . | |
| 2,494,128 | 1/1950 | Holmquist et al. .............. 72/370.15 X |
| 3,101,204 | 8/1963 | Pratley ................................ 285/356 X |
| 3,449,937 | 6/1969 | Dimmig ............................. 72/370.13 X |
| 4,134,430 | 1/1979 | Mukasa ................................. 285/332 X |
| 4,665,876 | 5/1987 | Hashimoto . | |
| 4,679,828 | 7/1987 | Bernardot . | |
| 4,881,763 | 11/1989 | Guido et al. ......................... 286/916 X |
| 5,529,349 | 6/1996 | Gibbs et al. ..................... 285/334.5 X |

FOREIGN PATENT DOCUMENTS

| 2031353 | 12/1971 | Germany . |
| 2631984 | 1/1978 | Germany . |
| 3801703C1 | 2/1989 | Germany . |

OTHER PUBLICATIONS

Document Search Report, Date Apr. 29, 1998, Country Europe.

*Primary Examiner*—Dave W. Arola
*Attorney, Agent, or Firm*—Evenson, McKeown, Edwards & Lenahan, PLLC

[57] ABSTRACT

A thin-walled steel tubing is to be constructed with a double cone coupling nipple for the tight screwed connection with a counterpart by way of a cap screw in a crack-resistant manner. The steel tubing is thin-walled and constructed of high-strength steel. With respect to the remaining tubing area, the nipple has at least partially at least approximately a double wall thickness. The steel tubing is not soft annealed at any point including the whole area of the nipple. With respect to the material, the contact surfaces of the nipple are harder than the surfaces of the countercontact. The cone angle of the sealing surface of the nipple measures over 100°.

8 Claims, 1 Drawing Sheet

1

DOUBLE CONE COUPLING NIPPLE OF A STEEL TUBING AND METHOD OF MAKING SAME

BACKGROUND AND SUMMARY OF THE INVENTION

This application claims the priority of German application 197 01 561.1-12 filed in Germany on Jan. 17, 1997.

The invention relates to a double cone coupling nipple of a steel tubing which is produced by cold forming an end area of this tubing, having a first conical sealing surface for the face-side tight contact in a hollow-cone-shaped wall of a counterpart which is adapted to this first conical surface, against which counterpart this nipple is screwed with a high tightening torque by means of a cap screw which is applied to the counterpart and is supported on the second conical surface of the nipple.

A nipple of this type is known from German Patent Document DE 3801703 C1. This known nipple is molded to a relatively thick-walled steel tube and therefore can be produced only with a relatively low degree of forming. As a result, no particularly high strength can be achieved in the case of that nipple. A high strength of the steel material in the nipple area is also not endeavored there since the steel material cold-formed into a nipple is only an ST 30 AL-material. As a result, the maximally achievable tensile strength in the nipple area is only at about 500–600 N/mm² there.

For achieving a good sealing, the conical surface used as the sealing surface is to be plastically deformable in the known construction, for the purpose of which at least the sealing surface area of the nipple is soft-annealed at least at a low surface depth. Because of the soft-annealed zone in the sealing surface area, that known nipple is susceptible to notch cracks if it is tightened by means of a high torque of a cap screw.

Based on the above, the invention relates to the problem of providing a nipple of the above-mentioned type with a high strength which can be fastened on a counterpart by means of an extremely high tightening torque by a screw cap.

This problem is solved according to the present invention by providing a double cone coupling nipple of the above-mentioned type wherein the steel tubing is thin-walled and constructed of high-strength steel, the nipple has at least partially at least approximately a double wall thickness with respect to the remaining tubing area, the steel tubing is not soft annealed at any point including the whole area of the nipple, the material of the contact surfaces of the nipple are harder than the material of the surfaces of the countercontact, and a cone angle of the sealing surface of the nipple measures over 100°.

The invention is based on the idea of designing the nipple area with particularly high values with respect to strength and hardness and to shift a material-related resilience into the adjoining counterparts. Furthermore, the plastic deformability which is absent in the case of the sealing surface of the nipple is replaced by a slight elastic deformability in this area. This elastic deformability is achieved by the shape of the conical sealing surface of the nipple in that this sealing surface is constructed with a relatively large cone angle. A large cone angle has the result that the conical surface extends virtually to the inside diameter of the tube so that the sealing area can be placed directly on the interior circumference of the tube. Because of the slight accumulation of material existing there in the case of a large cone angle, a slight elasticity of the nipple sealing surface occurs which improves the sealing effect.

By means of the construction of the double cone coupling nipple according to the invention, an extremely high tightening torque is permitted for the cap screw without resulting in notch cracks on the screwed nipple. Because of the firm and secure screwed connection of the nipple which can be achieved in this manner and which even at a high swinging and bending strain of the cap screw, results in no danger with respect to cracks, and separate parts can be fastened to the cap screw without risk.

A particularly economical type of fastening is obtained by the providing of an axial external thread on the end of the cap screw situated away from the nipple. A nut can be screwed on this external thread which permits a simple bracing of separate parts on the cap screw.

Other objects, advantages and novel features of the present invention will become apparent from the following detailed description of the invention when considered in conjunction with the accompanying drawings.

DETAILED DESCRIPTION OF THE INVENTION

In the embodiment shown, the double cone coupling nipple 1 is formed to a relatively thin-walled steel tube by means of cold forming.

The conical nipple surface has an angle of cone α of approximately 115°.

The steel tube 2 is made of an ST 52 material, in the case of which, by means of cold forming the double cone nipple 1, an increase in strength from 500 N/mm² in the starting condition to approximately 800 to 850 N/mm² after the upsetting operation is achieved.

The steel tube 2 with the defined thin wall thickness permits a thickening of the wall in a very harmonic form to almost twice the thickness of the initial condition. As a result, the nipple 1 is capable of withstanding very high stress.

Because of the large angle of cone α of the sealing surface of the nipple 1, the conical surface extends to the interior steel tube diameter. On the opening edge, this results in an area of the sealing surface which is slightly resilient which is important for a good sealing in the case of a nipple 1 made of a very firm and hard material.

Figure 1:
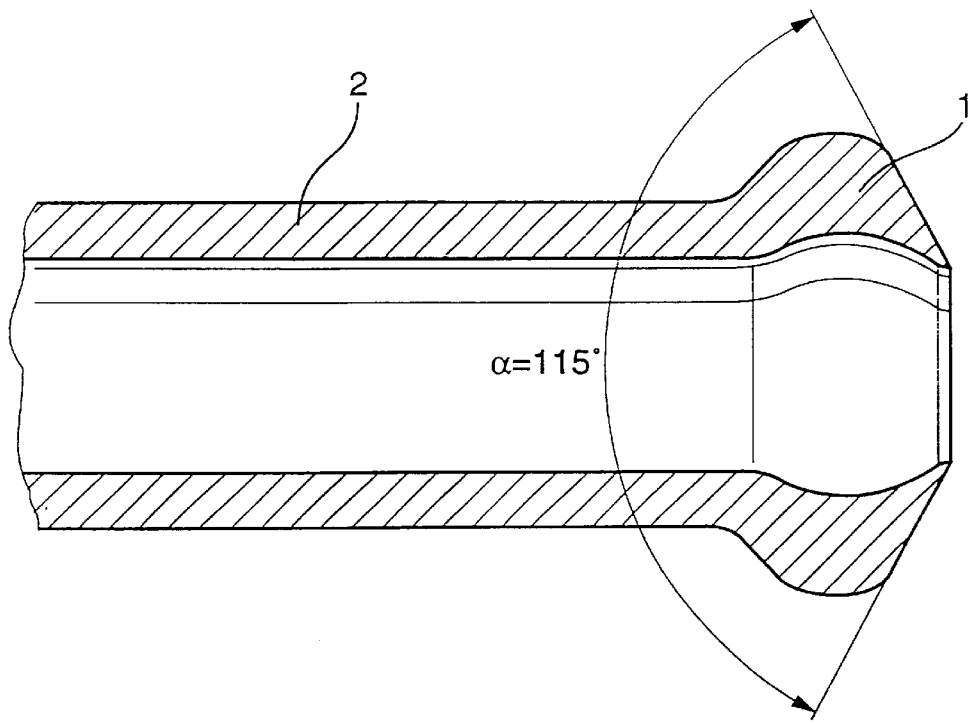
FIG. 1 is a sectional view of the end of a steel tubing with a formed-on double cone coupling nipple constructed according to a preferred embodiment of the present invention.
Figure 2:
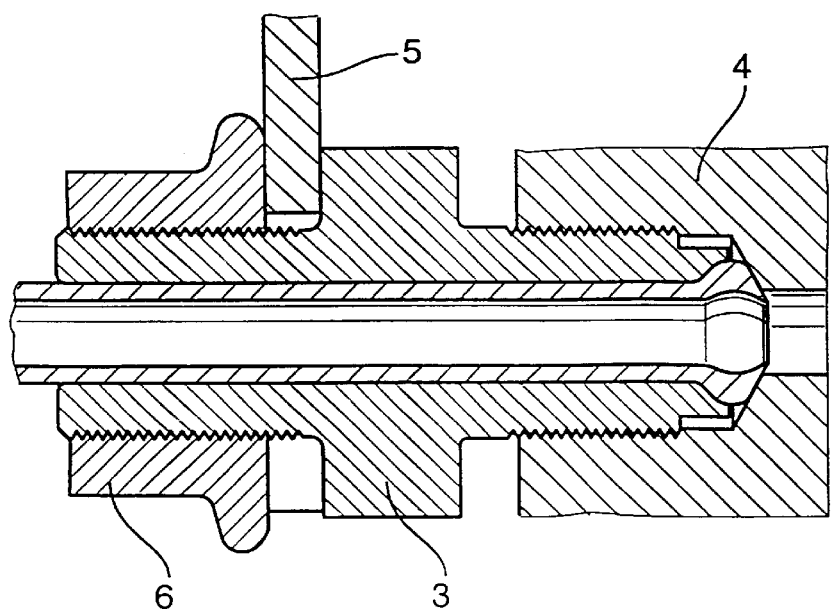
FIG. 2 is a sectional view of a steel tube fastened in a counterpart by way of the coupling nipple of FIG. 1.

In the case of the installed condition of a steel tubing 2 illustrated in FIG. 2, the nipple 1 is braced by means of a cap screw 3 against a counterpart 4 under a high tightening torque.

By means of the firm and secure bracing of the steel tube 2 according to the invention by way of the nipple 1 by means of the cap screw 3, the cap screw 3 can be used as a holder f or separate parts 5 without resulting in the risk of a crack formation for the nipple connection. The fastening of the separate part 5 can take place by a nut 6 which can be screwed onto the screw cap 3.

According to the embodiment shown, the nipple 1, which is upset by cold forming, is provided with such a shape that, for its fixing on a counterpart, the cap screw 3 can have a standardized form at least in its area resting against the nipple 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Tube coupling assembly comprising:

a steel tubing having a coupling nipple which is produced by cold forming an end area of the tubing and which has a first and second conical surface, the first conical surface being a sealing surface, a hollow counterpart provide with threads and having a cone shaped wall, the first conical surface being for face-side tight contact with the cone-shaped wall of the hollow counterpart which is adapted to contact said first conical surface, and a cap screw having threads thereon with a high tightening torque which is applied to the threads of the counterpart and supported on the second conical surface of the nipple, wherein the steel tubing is thin-walled and constructed of high-strength steel, wherein the conical area of the nipple defines a wall having a portion thereof with a thickness approximately double that of the remaining tubing area, wherein the material of the first and second conical surfaces of the nipple is harder than the material of the wall of the hollow counterpart, wherein a cone angle α of the first conical surface of the nipple measures over 100°, and wherein forming of the material in the conical area of the nipple produces a tensile strength of approximately 800 to 850 N/mm$^2$ which is higher by approximately 300 N/mm$^2$ than a tensile strength in the remaining tubing areas.

2. Tube coupling assembly according to claim 1, wherein the tubing consists of ST 52-steel.

3. Tube coupling assembly according to claim 2, wherein the cap screw is constructed as a holder for separate parts and is provided, on one end away from the end supported on the second conical surface of the nipple, with an axially extending external thread for receiving a fastening nut.

4. Tube-coupling assembly according to claim 1, wherein the cap screw is constructed as a holder for separate parts and is provided, on one end away from the end supported on the second conical surface of the nipple, with an axially extending external thread for receiving a fastening nut.

5. A method of making a tube coupling assembly with a coupling nipple of a steel tubing, comprising:

providing a thin wall cylindrical steel tubing, and cold forming an end area of the tubing to form a first and second conical surface, said first conical surface being a conical sealing surface for tight end face contact with a cone shaped wall of a hollow counterpart which is adapted to contact said conical surface, wherein the steel tubing is thin-walled and constructed of high-strength steel, wherein the conical area of the nipple defines a wall having a portion thereof with a thickness approximately double that of the remaining tubing area, wherein the material of the contact surface of the nipple is harder than the material of the wall of the hollow counterpart, and wherein a cone angle of the conical surface of the nipple measures over 100°, and wherein, forming of material in the conical area of the nipple, provides a tensile strength of approximately 800 to 850 N/mm$^2$ which is higher by approximately 300 N/mm$^2$ than a tensile strength in remaining tubing areas.

6. A method according to claim 5, wherein the tubing consists of ST 52-steel.

7. A method according to claim 5, further comprising providing a cap screw for engaging the hollow counter part and clamping the nipple in position by engaging the second conical surface, said cap screw including a holder for holding separate parts.

8. A method according to claim 7, wherein the cap screw is constructed as a holder for separate parts and is provided, on one end away from the engaging the second conical surface of the nipple, with an axially extending external thread for receiving a fastening nut.

* * * * *